(12) United States Patent  
Hunter

(10) Patent No.: US 9,160,463 B2
(45) Date of Patent: *Oct. 13, 2015

(54) METHOD FOR CANCELING INTERFERING WIRELESS SIGNALS IN CABLE CUSTOMER PREMISES EQUIPMENT DEVICES

(71) Applicant: Cable Television Laboratories, Inc., Louisville, CO (US)

(72) Inventor: David F. Hunter, Longmont, CO (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/033,301

(22) Filed: Sep. 20, 2013

(65) Prior Publication Data

US 2015/0085908 A1    Mar. 26, 2015

(51) Int. Cl.
*H04M 11/00* (2006.01)
*H04B 15/00* (2006.01)
*H04B 3/46* (2015.01)
*H04B 3/48* (2015.01)
*H04B 3/462* (2015.01)

(52) U.S. Cl.
CPC ............... *H04B 15/00* (2013.01); *H04B 3/46* (2013.01); *H04B 3/462* (2013.01); *H04B 3/48* (2013.01)

(58) Field of Classification Search
None
See application file for complete search history.

(56) References Cited

U.S. PATENT DOCUMENTS 6,477,212 B1 * 11/2002 Bingel et al. ............... 375/346
8,103,235 B2 * 1/2012 Shiotsu et al. .............. 455/296

* cited by examiner

*Primary Examiner* — Maria El-Zoobi
(74) *Attorney, Agent, or Firm* — Davis Wright Tremaine LLP; James S. Hsue; Heather Colburn

(57) ABSTRACT

A customer premises equipment ("CPE") device for use with a cable signal provided by a cable system. The CPE device includes an antenna and a signal processing system. The antenna receives an interfering radio frequency ("RF") signal generated by one or more external wireless signal sources as a copy signal. The signal processing system receives the interfering RF signal, the cable signal, and the copy signal, modifies the copy signal to produce a processed copy signal, and combines the cable signal, the interfering RF signal, and the processed copy signal to produce a combined signal. The signal processing system also monitors error rate values of the combined signal, and adjusts the copy signal such that the copy signal at least partially cancels the interfering RF signal in the combined signal thereby reducing the error rate values of the combined signal.

23 Claims, 2 Drawing Sheets

US 9,160,463 B2

METHOD FOR CANCELING INTERFERING WIRELESS SIGNALS IN CABLE CUSTOMER PREMISES EQUIPMENT DEVICES

BACKGROUND OF THE INVENTION

1. Field of the Invention

The present invention is directed generally to systems and methods for reducing or eliminating effects of interfering radio frequency signals on cable customer premises equipment devices.

2. Description of the Related Art

It has been reported that cable customer premises equipment ("CPE") devices, such as cable set-top-boxes, cable modems, and embedded multimedia terminal adapters ("EMTAs"), are experiencing problems functioning properly in the presence of wireless telephones because wireless telephones introduce interfering radio frequency ("RF") signals into the CPE devices. While many CPE devices include shielding that helps reduce such interfering wireless signals inside the CPE devices, the amplitudes of some strong wireless signals (e.g., RF signals used by wireless Long Term Evolution ("LTE") cellular telephones) are large enough to cause signal-processing problems in the CPE devices. Further, retail grade cable and RF splitters used by some people in their homes can be highly susceptible to RF interference. Thus, cable and RF splitters may receive interfering signals and function as a point of ingress into CPE devices for interfering signals.

Currently available methods of dealing with problems caused by interfering RF signals involve either abandoning the use of some frequencies (e.g., those experiencing significant RF interference) by a cable system, and/or increasing the shielding of the CPE devices. Abandoning the use of some frequencies is undesirable because doing so reduces data bandwidth and the number of video channels available to customers. Unfortunately, increasing the shielding of the CPE devices simply does not provide enough isolation from the interfering RF signal in some cases.

Therefore, a need exists for CPE devices configured to operate in the presence of strong wireless signals. CPE devices configured to significantly reduce interfering signals in the CPE devices would be particularly desirable. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
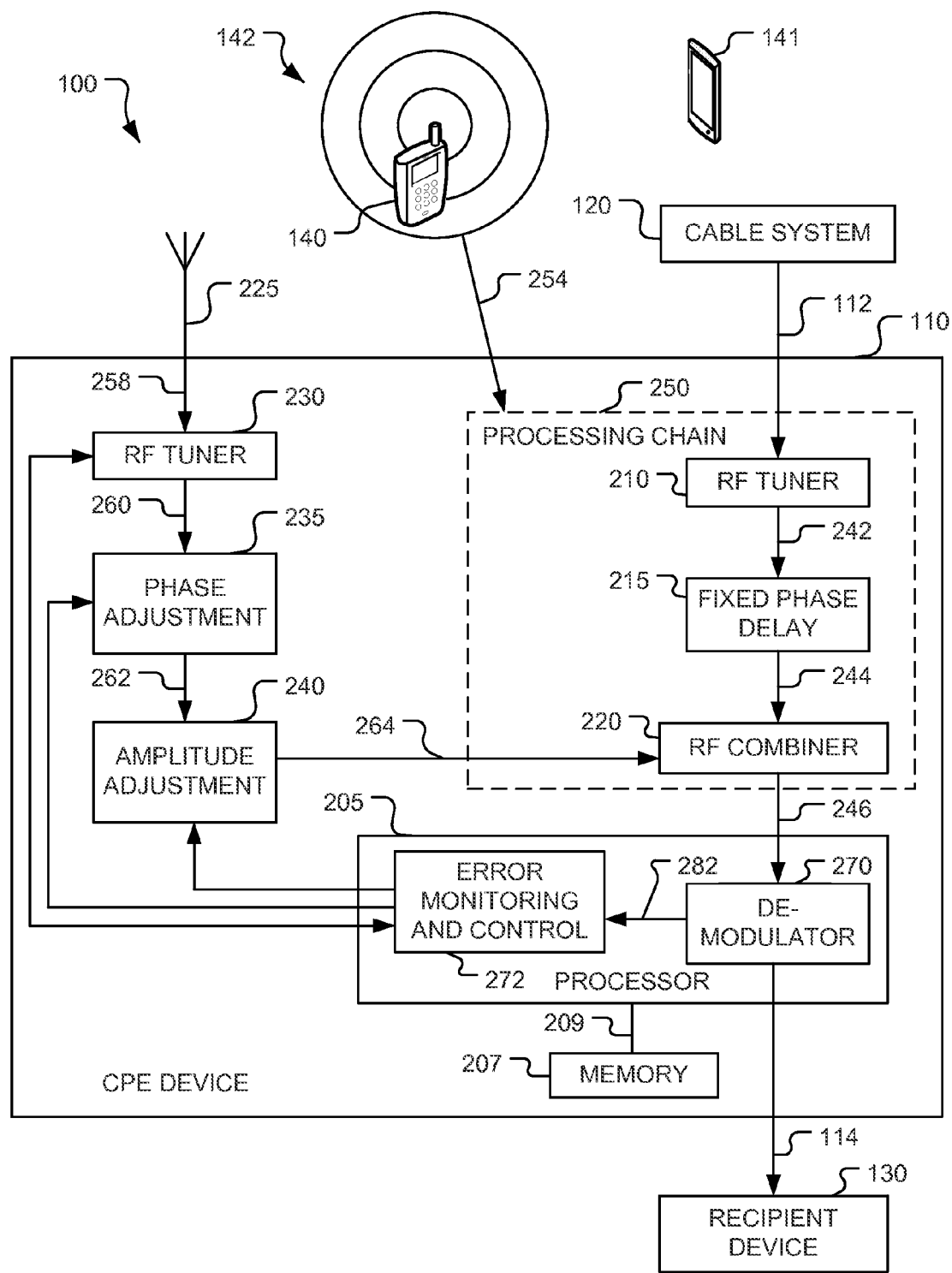
FIG. 1 is a block diagram of a system that includes an exemplary CPE device that receives a cable signal from an exemplary cable system, and an interfering signal from one or more wireless signal sources.

FIG. 1 is a block diagram of a system 100 including an exemplary customer premises equipment ("CPE") device 110 connected to an exemplary cable system 120. While FIG. 1 illustrates the single CPE device 110, those of ordinary skill in the art appreciate that a plurality of CPE devices like the CPE device 110 may be connected to the cable system 120. The cable system 120 may include any conventional cable system configured to transmit a cable signal (illustrated by the arrow 112) to the CPE device 110. The CPE device 110 may include or be connected to a recipient device 130. The CPE device 110 receives the cable signal (illustrated as arrow 112) from the cable system 120, processes the cable signal to produce a processed signal (illustrated as arrow 114), and provides the processed signal to the recipient device 130. The recipient device 130 may be a display device configured to generate a display viewable by a user (not shown) based at least in part on the processed signal (illustrated as the arrow 114). By way of a non-limiting example, the recipient device 130 may be implemented as a television set, a computing device (e.g., a personal computer), and the like. As is apparent to those of ordinary skill in the art, the CPE device 110 and the recipient device 130 may be combined into a single device (not shown).

One or more external wireless signal sources (e.g., a cellular telephone 140, a cellular telephone 141, and the like) may generate wireless or RF signals (e.g., RF signals 142). Non-limiting examples of external wireless signal sources include cellular telephones and the like. By way of a non-limiting example, the cellular telephone 140 may configured to communicate using the Long Term Evolution ("LTE") standard, and the RF signals 142 may be LTE signals.

The CPE device 110 may receive the RF signals (e.g., the RF signals 142) generated by the one or more wireless signal sources (e.g., the cellular telephone 140, the cellular telephone 141, and the like) as an interfering signal (illustrated as arrow 254) that combines with the cable signal (illustrated as arrow 112). This combination may negatively affect the quality of the processed signal (illustrated as arrow 114) provided to the recipient device 130. The interfering signal (illustrated as arrow 254) may be received by the CPE device 110 and/or components connected to the CPE device 110 (such as RF splitters, cables, and the like) that transmit the interfering signal or a portion thereof to the CPE device 110. For ease of illustration, the interfering signal (illustrated as arrow 254) will be described as being received by the CPE device 110.

By way of a non-limiting example, the CPE device 110 may be implemented as a cable set-top-box, a television set, a cable modem, an EMTA, a computing device (e.g., a personal computer), and the like. The CPE device 110 includes a processor 205, memory 207, a first RF tuner 210, a fixed phase delay 215, a RF combiner 220, an antenna 225, a second RF tuner 230, a phase adjustment 235, and an amplitude adjustment 240. The first RF tuner 210, the fixed phase delay 215, the RF combiner 220, the second RF tuner 230, the phase adjustment 235, the amplitude adjustment 240, the processor 205, and the memory 207 may be characterized as being signal processing components. The first RF tuner 210, the phase adjustment 235, and the amplitude adjustment 240 may be characterized as being signal adjustment components.

The first RF tuner 210 determines the frequency or frequencies on which the CPE device 110 receives the cable signal (illustrated as arrow 112) from the cable system 120. The first RF tuner 210 supplies the received cable signal to the fixed phase delay 215 as an RF signal (illustrated as arrow 242). The fixed phase delay 215 delays the RF signal (illustrated as arrow 242) by a fixed amount, and outputs a phase delayed signal (illustrated as arrow 244) to the RF combiner 220. For ease of illustration, the phase delayed signal (illustrated as arrow 244) will be referred to as a processed cable signal. As will be described in detail below, the RF combiner 220 outputs a combined signal (illustrated as arrow 246) to the processor 205.

Together the first RF tuner 210, the fixed phase delay 215, and the RF combiner 220 may be characterized as being a signal processing chain 250. Unfortunately, the processing chain 250 also receives the interfering signal (illustrated as arrow 254). Thus, the combined signal (illustrated as arrow 246) includes the processed cable signal (illustrated as arrow 244), and the interfering signal (illustrated as arrow 254) received by the processing chain 250.

The antenna 225 is configured to receive the RF signals (e.g., the RF signals 142) generated by the one or more interfering wireless signal sources (e.g., the cellular telephone 140, the cellular telephone 141, and the like). Thus, the antenna 225 receives a copy of the same RF signals that are received by (and interfere with) the processing chain 250. For ease of illustration, the signal(s) received by the antenna 225 will be referred to as a "copy signal" (illustrated as arrow 258). As is apparent to those of ordinary skill in the art, the copy signal has a plurality of signal parameters, such as an amplitude value, an amount of phase shift, an amount of attenuation, and the like.

The antenna 225 supplies the copy signal (illustrated as arrow 258) to the second RF tuner 230. The second RF tuner 230 determines the frequency or frequencies on which the CPE device 110 receives the copy signal (illustrated as arrow 258), and supplies the received copy signal to the phase adjustment 235 as an RF signal (illustrated as arrow 260). The phase adjustment 235 adjusts the phase of the RF signal (illustrated as arrow 260), and outputs a phase adjusted signal (illustrated as arrow 262) to the amplitude adjustment 240. The amplitude adjustment 240 adjusts the amplitude of the phase adjusted signal (illustrated as arrow 262), and outputs a phase and amplitude adjusted signal (illustrated as arrow 264) to the RF combiner 220. For ease of illustration, the phase and amplitude adjusted signal (illustrated as arrow 264) will be referred to as a processed copy signal. The RF combiner 220 combines the processed copy signal (illustrated as arrow 264) with the processed cable signal (illustrated as arrow 244) and, if present, the interfering signal (illustrated as arrow 254) received by the processing chain 250. Thus, the combined signal (illustrated as arrow 246) may have three components: (1) the processed cable signal (illustrated as arrow 244); (2) the processed copy signal (illustrated as arrow 264); and (3) the interfering signal (illustrated as arrow 254).

The processor 205 receives the combined signal (illustrated as arrow 246) from the RF combiner 220, and adjusts the processed copy signal (illustrated as arrow 264) to at least partially cancel out the interfering signal (illustrated as arrow 254). The processor 205 may be implemented by a microprocessor, microcontroller, application-specific integrated circuit ("ASIC"), digital signal processor ("DSP"), or the like. The processor 205 may be integrated into an electrical circuit, such as a conventional circuit board, that supplies power to the processor 205. The processor 205 may include internal memory and/or the memory 207 may be coupled thereto. The present invention is not limited by the specific hardware component(s) used to implement the processor 205 and/or the memory 207.

The memory 207 is a computer readable medium that includes instructions or computer executable components that are executed by the processor 205. The memory 207 may be implemented using transitory and/or non-transitory memory components. The memory 207 may be coupled to the processor 205 by an internal bus 209.

The memory 207 may comprise random access memory ("RAM") and read-only memory ("ROM"). The memory 207 contains instructions and data that control the operation of the processor 205. The memory 207 may also include a basic input/output system ("BIOS"), which contains the basic routines that help transfer information between elements within the CPE device 110.

Optionally, the memory 207 may include internal and/or external memory devices such as hard disk drives, floppy disk drives, and optical storage devices (e.g., CD-ROM, R/W CD-ROM, DVD, and the like). The CPE device 110 may also include one or more I/O interfaces (not shown) such as a serial interface (e.g., RS-232, RS-432, and the like), an IEEE-488 interface, a universal serial bus ("USB") interface, a parallel interface, and the like, for the communication with removable memory devices such as flash memory drives, external floppy disk drives, and the like.

In the embodiment illustrated, the processor 205 implements a demodulator 270, and an error monitoring and control block 272. While the demodulator 270, and the error monitoring and control block 272 have been illustrated as separate functional blocks, in alternate embodiments, the demodulator 270, and the error monitoring and control block 272 may be combined into a single functional block. Further, the functionality attributed to the demodulator 270, and the error monitoring and control block 272 may be divided into any suitable number of separate functional blocks.

The processor 205 is configured to execute software implementing the demodulator 270, and the error monitoring and control block 272. Such software may be implemented by computer executable instructions stored in memory 207. For example, the memory 207 may store instructions executable by the processor 205 that when executed cause the CPE device 110 to perform a method 300 (see FIG. 2) described below.

The demodulator 270 receives the combined signal (illustrated as arrow 246), and demodulates the combined signal to produce a data stream (not shown). The processor 205 may process the data stream to produce the processed signal (illustrated as arrow 114), which is transmitted by the processor 205 to the recipient device 130. The processed signal (illustrated as arrow 114) may include audio and video signals that are displayable by the recipient device 130. The demodulator 270 may be configured to perform forward error correction on the combined signal (illustrated as arrow 246). In such embodiments, the demodulator 270 may occasionally (e.g., periodically) calculate an error rate value, and transmit the error rate value to the error monitoring and control block 272. Thus, a series of error rate values (illustrated as arrow 282) may be received by the error monitoring and control block 272 as an error rate signal. While the demodulator 270 is described as implementing forward error correction, this is not a requirement. Alternatively, forward error correction processing may be implemented in a separate functional block in the CPE device 110. For example, the error monitoring and control block 272 may determine the error rate values of the combined signal (illustrated as arrow 246).

The error monitoring and control block 272 monitors the error rate values of the combined signal (illustrated as arrow 246), and determines whether to modify the processed copy signal (illustrated as arrow 264) in a manner that at least partially cancels the interfering signal (illustrated as arrow 254) present in the combined signal to thereby reduce the error rate values of the combined signal. The error monitoring and control block 272 may modify the processed copy signal (illustrated as arrow 264) by instructing the phase adjustment 235 to modify the amount of phase shift applied to the RF signal (illustrated as arrow 260), and/or instructing the amplitude adjustment 240 to modify the amount of amplitude adjustment applied to the phase adjusted signal (illustrated as arrow 262).

The first RF tuner 210, the fixed phase delay 215, the RF combiner 220, the second RF tuner 230, the phase adjustment 235, the amplitude adjustment 240, the demodulator 270, and the error monitoring and control block 272 are functional blocks. The functions of each of these functional blocks may be implemented in a number of different ways, such as in hardware and/or in software. Further, as is appreciated by those of ordinary skill in the art, the functions attributed to these functional blocks may be combined into one or more functional blocks, and/or distributed differently in any number of functional blocks.

Figure 2:
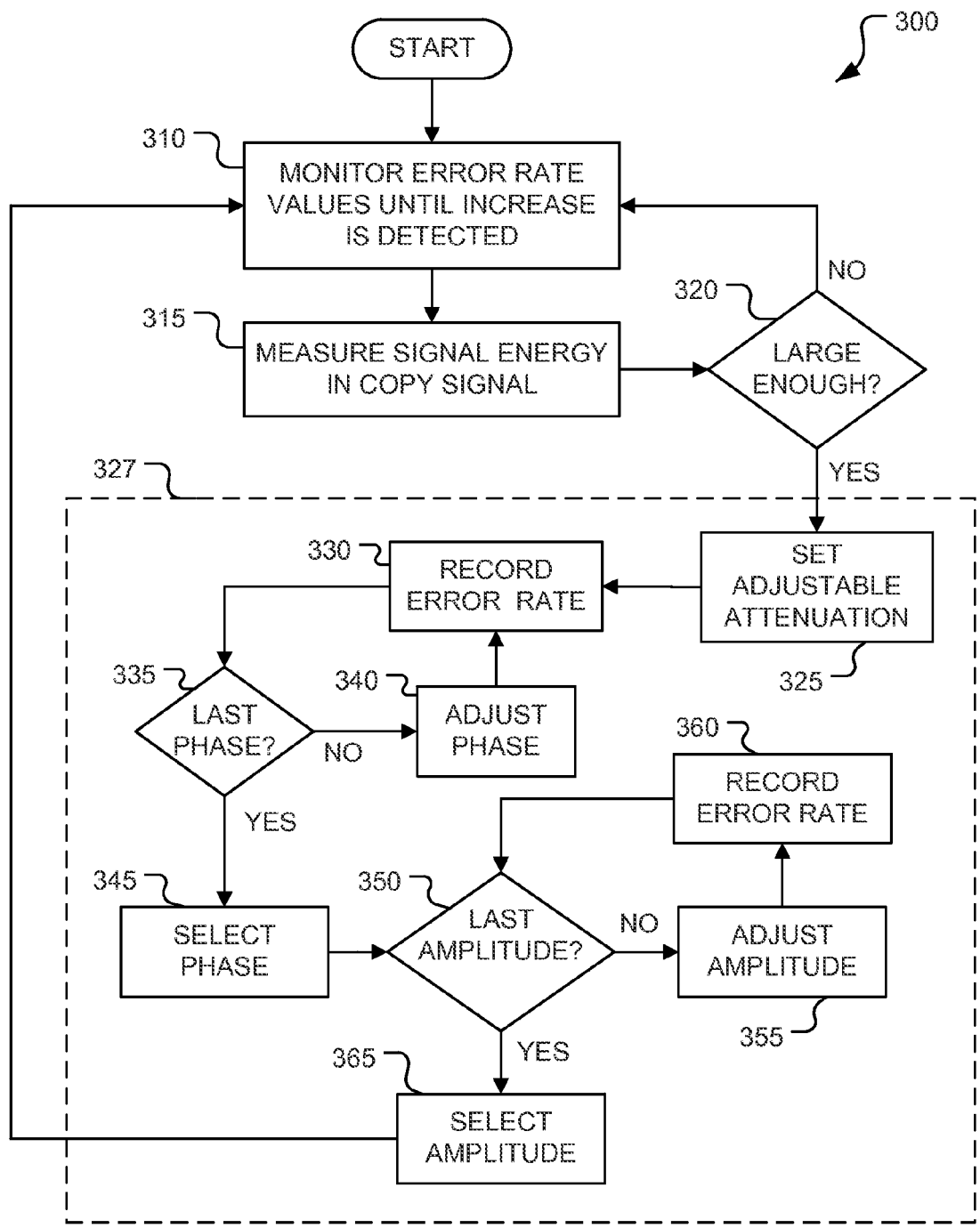
FIG. 2 is a flow diagram of a method of reducing the effects of the interfering signal on the cable signal.

FIG. 2 is a flow diagram of the method 300 of modifying the processed copy signal (illustrated as arrow 264) to at least partially cancel the interfering signal (illustrated as arrow 254) in the combined signal (illustrated as arrow 246). The method 300 may be performed by the processor 205. For ease of illustration, the method 300 may be described as being performed by the error monitoring and control block 272.

In first block 310, the error monitoring and control block 272 monitors the error rate values (illustrated as arrow 282) received from the demodulator 270 until an increase in the error rate values is detected. By way of a non-limiting example, the error monitoring and control block 272 may detect an increase has occurred when the error rate values exceeds a threshold amount.

In next block 315, the error monitoring and control block 272 measures signal energy of the copy signal (illustrated as arrow 258) received by the antenna 225. By way of a non-limiting example, the second RF tuner 230 may measure the signal energy and provide it to the error monitoring and control block 272.

In decision block 320, the error monitoring and control block 272 determines whether the signal energy is large enough to be causing the increase in the error rate values. The decision in decision block 320 is "NO" when the error monitoring and control block 272 determines the signal energy is not large enough. In other words, when the decision is "NO," the increase in the error rate values is being caused by factors other than local noise ingress. On the other hand, the decision in decision block 320 is "YES" when the error monitoring and control block 272 determines the signal energy is large enough to be causing to be causing the increase in the error rate values.

By way of a non-limiting example, the decision in decision block 320 may be "YES," when the signal energy exceeds a predetermined threshold value. If the signal energy does not exceed the predetermined threshold value, decision in decision block 320 may be "NO."

When the decision in decision block 320 is "NO," the error monitoring and control block 272 returns to block 310 to continue monitoring the error rate values.

When the decision in decision block 320 is "YES," the error monitoring and control block 272 advances to block 325 to begin a noise cancellation process 327 portion of the method 300. In block 325, the error monitoring and control block 272 sets the adjustable attenuation of the copy signal (illustrated as arrow 258). By way of a non-limiting example, the amplitude adjustment 240 may be configured to attenuate the copy signal (illustrated as arrow 258) in response to an instruction from the error monitoring and control block 272. In such embodiments, the error monitoring and control block 272 instructs the amplitude adjustment 240 to set the amount of attenuation of the copy signal (illustrated as arrow 258) such that the signal energy of the copy signal is approximately equal to the average signal energy of the interfering signal (illustrated as arrow 254) received by the CPE device 110 at the operating frequency.

In block 330, the error monitoring and control block 272 records the error rate value (e.g., in the memory 207) received after the amount of attenuation of the copy signal is set in block 325.

In decision block 335, the error monitoring and control block 272 determines whether all available phase values have been evaluated. The decision in decision block 335 is "NO" when the error monitoring and control block 272 determines at least one available phase value has not been evaluated. On the other hand, the decision in decision block 335 is "YES" when the error monitoring and control block 272 determines all available phase values have been evaluated.

When the decision in decision block 335 is "NO," in block 340, the error monitoring and control block 272 instructs the phase adjustment 235 to modify the amount of phase shift applied to the RF signal (illustrated as arrow 260). Then, the error monitoring and control block 272 returns to block 330, and records the error rate value (e.g., in the memory 207) received after the amount of phase shift was adjusted in block 340.

When the decision in decision block 335 is "YES," in block 345, the error monitoring and control block 272 selects the amount of phase shift that produced the lowest error rate value recorded (in block 330). Then, the error monitoring and control block 272 instructs the phase adjustment 235 to apply the selected amount of phase shift to the RF Signal (illustrated as arrow 260).

The process performed by blocks 330, 335, 340, and 345 tries to adjust the processed copy signal (illustrated as arrow 264) such that the processed copy signal is approximately 180 degrees out of phase with the interfering signal (illustrated as arrow 254). In other words, blocks 330, 335, 340, and 345 try to adjust the phase of the processed copy signal so that it at least partially cancels out the interfering signal in the combined signal (illustrated as arrow 246).

By way of a non-limiting example, after block 325, the amount of phase shift applied to the RF signal (illustrated as arrow 260) may be set to an initial phase shift amount. Then, in block 340, the initial phase shift amount may be increased (or decreased) by an incremental amount. Blocks 330, 335, and 340 repeat until a final phase shift amount is reached. Then, in block 345, the error monitoring and control block 272 selects the phase shift amount that provided the lowest error rate value.

To improve the amount of cancelation, the amplitude of the processed copy signal and the amplitude of the interfering signal should match (or be substantially similar). This is achieved by blocks 350, 355, 360, and 365 of the method 300.

In decision block 350, the error monitoring and control block 272 determines whether all available amplitude values have been evaluated. The decision in decision block 350 is "NO" when the error monitoring and control block 272 determines at least one available amplitude value has not been evaluated. On the other hand, the decision in decision block 350 is "YES" when the error monitoring and control block 272 determines all available amplitude values have been evaluated.

When the decision in decision block 350 is "NO," in block 355, the error monitoring and control block 272 instructs the amplitude adjustment 240 to modify the amplitude value applied to the to the phase adjusted signal (illustrated as arrow 262). Then, the error monitoring and control block 272 advances to block 360, and records the error rate value (e.g., in the memory 207) received after the amplitude value was adjusted in block 355.

When the decision in decision block 350 is "YES," in block 365, the error monitoring and control block 272 selects the amplitude value that produced the lowest error rate value recorded (in block 360). Then, the error monitoring and control block 272 instructs the amplitude adjustment 240 to apply the selected amplitude value to the phase adjusted signal (illustrated as arrow 262).

By way of a non-limiting example, after block 345, the amplitude value may be set to an initial amplitude value. Then, in block 355, the initial amplitude value may be increased (or decreased) by an incremental amount. Blocks 350, 355, and 360 repeat until a final amplitude value is reached. Then, in block 365, the amplitude value that is closest to the amplitude value of the interfering signal may be selected by selecting the amplitude value that provided the lowest error rate value.

At this point, the processed copy signal (illustrated as arrow 264) and the interfering signal (illustrated as arrow 254) components of the combined signal (illustrated as arrow 246) are substantially canceling one another. To continue monitoring the combined signal, the error monitoring and control block 272 returns to block 310. If at any point during the noise cancellation process 327 portion of the method 300, the signal energy of the copy signal (illustrated as arrow 258) received by the antenna 225 goes to zero (or falls below a predefined threshold value), the error monitoring and control block 272 may return to block 310.

By performing the method 300, the error monitoring and control block 272 continuously monitors the combined signal, and when appropriate, adjusts the amplitude value and/or the amount of phase shift of the copy signal in a feedback loop based on the error rate values of the combined signal.

By using the CPE device 110, cable companies may continue effectively using RF spectrum in their cable systems that coincides with licensed wireless spectrum. Use of this spectrum by the cable companies may be critical to business models that include providing a desired amount of data bandwidth and/or a desired number of video channels to customers.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A customer premises equipment ("CPE") device for use with a cable signal provided by a cable system, and an interfering radio frequency ("RF") signal generated by one or more external wireless signal sources, the CPE device comprising:
   an antenna configured to receive the interfering RF signal as a copy signal; and
   a signal processing system configured to:
   receive the interfering RF signal, the cable signal, and the copy signal,
   modify at least one signal parameter of the copy signal to produce a processed copy signal,
   combine the cable signal, the interfering RF signal, and the processed copy signal to produce a combined signal,
   monitor error rate values of the combined signal,
   determine whether the at least one signal parameter of the copy signal is to be adjusted based at least in part on an amount of signal energy in the copy signal and the error rate values of the combined signal, and
   adjust the at least one signal parameter of the copy signal after the signal processing system determines that the at least one signal parameter copy signal is to be adjusted, the signal processing system adjusting the at least one signal parameter of the copy signal such that the copy signal at least partially cancels the interfering RF signal in the combined signal thereby reducing the error rate values of the combined signal.

2. The CPE device of claim 1, wherein the signal processing system is further configured to output a processed signal to a recipient device, the processed signal being based on the combined signal.

3. The CPE device of claim 2, wherein the processed signal is displayable by the recipient device.

4. The CPE device of claim 1, wherein the signal processing system comprises:
   at least one signal adjustment component configured to modify the at least one signal parameter of the copy signal to produce the processed copy signal;
   a signal processing chain configured to receive and combine the cable signal, the interfering RF signal, and the processed copy signal to produce the combined signal;

an error detection component configured to determine the error rate values for the combined signal; and
a monitoring component configured to monitor the error rate values, determine whether the at least one signal parameter of the copy signal is to be adjusted, and instruct the at least one signal adjustment component to adjust the at least one signal parameter of the copy signal after the monitoring component determines that the at least one signal parameter of the copy signal is to be adjusted.

5. The CPE device of claim 4, wherein the monitoring component is further configured to determine when the error rate values are increasing, and the copy signal comprises more than a threshold amount of signal energy; and
the monitoring component determines that the at least one signal parameter of the copy signal is to be adjusted only after the monitoring component has determined that the error rate values are increasing, and the copy signal comprises more than the threshold amount of signal energy.

6. The CPE device of claim 5, wherein the monitoring component determines the error rate values are increasing when the error rate values exceed a predetermined error threshold value.

7. The CPE device of claim 4, wherein the at least one signal parameter of the copy signal comprises an amount of phase shift; and
the at least one signal adjustment component comprises a phase adjustment component configured to adjust the amount of phase shift of the copy signal.

8. The CPE device of claim 7, wherein the amount of phase shift of the copy signal is adjusted to shift the copy signal to be approximately 180 degrees out of phase with respect to the interfering RF signal.

9. The CPE device of claim 4, wherein the at least one signal parameter of the copy signal comprises amplitude; and
the at least one signal adjustment component comprises an amplitude adjustment component configured to adjust the amplitude of the copy signal.

10. The CPE device of claim 9, wherein the at least one signal parameter of the copy signal comprises an amount of phase shift; and
the at least one signal adjustment component comprises a phase adjustment component configured to adjust the amount of phase shift of the copy signal.

11. The CPE device of claim 10, wherein the amount of phase shift of the copy signal is adjusted to shift the copy signal to be approximately 180 degrees out of phase with respect to the interfering RF signal; and
the amplitude of the copy signal is adjusted to approximately match the amplitude of the interfering RF signal.

12. The CPE device of claim 4, wherein the at least one signal parameter of the copy signal comprises an amount of attenuation; and
the at least one signal adjustment component comprises an adjustable attenuation component configured to adjust the amount of attenuation of the copy signal.

13. The CPE device of claim 1, wherein the signal processing system is further configured to demodulate the combined signal.

14. The CPE device of claim 13, further comprising:
a display device configured to receive and display the demodulated combined signal.

15. The CPE device of claim 1 for use with a display device, wherein the signal processing system comprises a demodulator configured to demodulate the combined signal for display by the display device.

16. A customer premises equipment ("CPE") device for use with a cable signal provided by a cable system, and an interfering radio frequency ("RF") signal generated by one or more external wireless signal sources, the CPE device comprising:
an antenna configured to receive the interfering RF signal as a copy signal;
at least one signal adjustment component configured to adjust at least one signal parameter of the copy signal to produce a processed copy signal;
a signal processing chain configured to receive and combine the cable signal, the interfering RF signal, and the processed copy signal to produce a combined signal;
at least one processor; and
a memory connected to the at least one processor, the memory storing instructions executable by the at least one processor that when executed thereby implement a method comprising:
determining error rate values for the combined signal;
determining when the error rate values are increasing;
determining when the copy signal comprises more than a threshold amount of signal energy; and
when it is determined that the error rate values are increasing, and the copy signal comprises more than a threshold amount of signal energy, instructing the at least one signal adjustment component to adjust the at least one signal parameter of the copy signal such that the error rate values for the combined signal decrease.

17. The CPE device of claim 16, wherein the at least one signal parameter of the copy signal comprises an amount of attenuation, and
the at least one signal adjustment component comprises an adjustable attenuation component configured to adjust the amount of attenuation of the copy signal.

18. The CPE device of claim 16, wherein the at least one signal parameter of the copy signal comprises an amount of phase shift; and
the at least one signal adjustment component comprises a phase adjustment component configured to adjust the amount of phase shift of the copy signal.

19. The CPE device of claim 18, wherein the at least one signal parameter of the copy signal comprises amplitude; and
the at least one signal adjustment component comprises an amplitude adjustment component configured to adjust the amplitude of the copy signal.

20. A system for use with an interfering radio frequency ("RF") signal generated by one or more external wireless signal sources, the system comprising a cable system and a plurality of customer premises equipment ("CPE") devices connected to the cable system, the cable system being configured to transmit a cable signal to each of the CPE devices, each of the CPE devices comprising an antenna configured to receive the interfering RF signal as a copy signal; and a signal processing system configured to:
receive the copy signal from the antenna,
receive the interfering RF signal, and the cable signal,
modify at least one signal parameter of the copy signal to produce a processed copy signal,
combine the cable signal, the interfering RF signal, and the processed copy signal to produce a combined signal,
modify the combined signal to produce a processed signal,
monitor error rate values of the combined signal,
determine whether the at least one signal parameter of the copy signal is to be adjusted based at least in part on an amount of signal energy in the copy signal and the error rate values of the combined signal, and adjust the at least one signal parameter of the copy signal to reduce the error rate values of the combined signal after the signal processing system determines that the at least one signal parameter copy signal is to be adjusted.

21. The system of claim 20 for use with a recipient device, wherein the signal processing system is further configured to output the processed signal to the recipient device.

22. A method for use with a cable signal provided by a cable system, and an interfering radio frequency ("RF") signal generated by one or more external wireless signal sources, the method being performed by a customer premises equipment ("CPE") device comprising a memory, a processor, signal processing components, and an antenna, the method comprising:

receiving, at the antenna of the CPE device, the interfering RF signal as a copy signal;

processing, by at least a first portion of the signal processing components, the copy signal to produce a processed copy signal;

receiving, by at least a second portion of the signal processing components, the cable signal and the interfering RF signal;

combining, by at least a third portion of the signal processing components, the cable signal, the interfering RF signal, and the processed copy signal to produce a combined signal;

determining, by the processor, error rate values for the combined signal;

determining, by the processor, whether the error rate values are increasing;

determining, by the processor, whether the copy signal comprises more than a threshold amount of signal energy;

when the processor determines that the error rate values are increasing and the copy signal comprises more than the threshold amount of signal energy, instructing, by the processor, the first portion of the signal processing components to modify the processing of the copy signal to change a value of at least one signal parameter of the copy signal to reduce the error rate values of the combined signal; and modifying, by the processor, the combined signal to produce a processed signal.

23. The method of claim 22 for use with a recipient device, the method further comprising:

outputting the processed signal to the recipient device.

* * * * *